(12) United States Patent
Ohtsu et al.

(10) Patent No.: US 7,234,876 B2
(45) Date of Patent: Jun. 26, 2007

(54) MULTI CORE OPTICAL CONNECTOR ASSEMBLY

(75) Inventors: Nobuaki Ohtsu, Kanagawa (JP); Takehiro Hayashi, Kanagawa (JP); Shigeru Kobayashi, Tokyo (JP)

(73) Assignee: Tyco Electronics AMP K.K, Kanagawa-Ken (JP)

( * ) Notice: Subject to any disclaimer, the term of this patent is extended or adjusted under 35 U.S.C. 154(b) by 157 days.

(21) Appl. No.: 11/146,710

(22) Filed: Jun. 7, 2005

(65) Prior Publication Data

US 2005/0271328 A1   Dec. 8, 2005

(30) Foreign Application Priority Data

Jun. 7, 2004   (JP) .............................. 2004-168857

(51) Int. Cl.
  *G02B 6/38* (2006.01)
(52) U.S. Cl. .............................. 385/59; 385/53; 385/56; 385/52; 385/60
(58) Field of Classification Search .................. 383/59, 383/53, 56, 52, 60
See application file for complete search history.

(56) References Cited

U.S. PATENT DOCUMENTS 5,242,315 A    9/1993  O'Dea
5,367,595 A *  11/1994 Jennings et al. ............... 385/71
5,870,515 A    2/1999  Ott et al.
6,132,105 A *  10/2000 Konda et al. .................. 385/65
6,439,780 B1 * 8/2002  Mudd et al. ................... 385/83
6,474,878 B1 * 11/2002 Demangone ................. 385/78
6,799,900 B2 * 10/2004 Shiino et al. .................. 385/80

FOREIGN PATENT DOCUMENTS

JP      05-313040    11/1993
JP      2002-148486   5/2002
WO      WO 97/34176   9/1997

* cited by examiner

*Primary Examiner*—Frank G. Font
*Assistant Examiner*—James P. Hughes
(74) *Attorney, Agent, or Firm*—Barley Snyder LLC

(57) ABSTRACT

A first guiding mechanism is formed by the interior shape of an engagement portion of a plug housing and the exterior shape of an engagement portion of a receptacle housing, to be guided and inserted into the engagement portion. A second guiding mechanism is formed by guide posts and guide holes. A third guiding mechanism is formed by the interior shape of the engagement portion of the receptacle housing and the exterior shapes of first multi core ferrules of the plug side optical connector, to be inserted into the engagement portion of the receptacle housing. A fourth guiding mechanism is formed by guide pins of second multi core ferrules and guide pin apertures, for receiving the guide pins of the first multi core ferrules. The first, second, third, and fourth guiding mechanisms operate in this order during engagement of a receptacle side optical connector and a plug side optical connector.

15 Claims, 14 Drawing Sheets

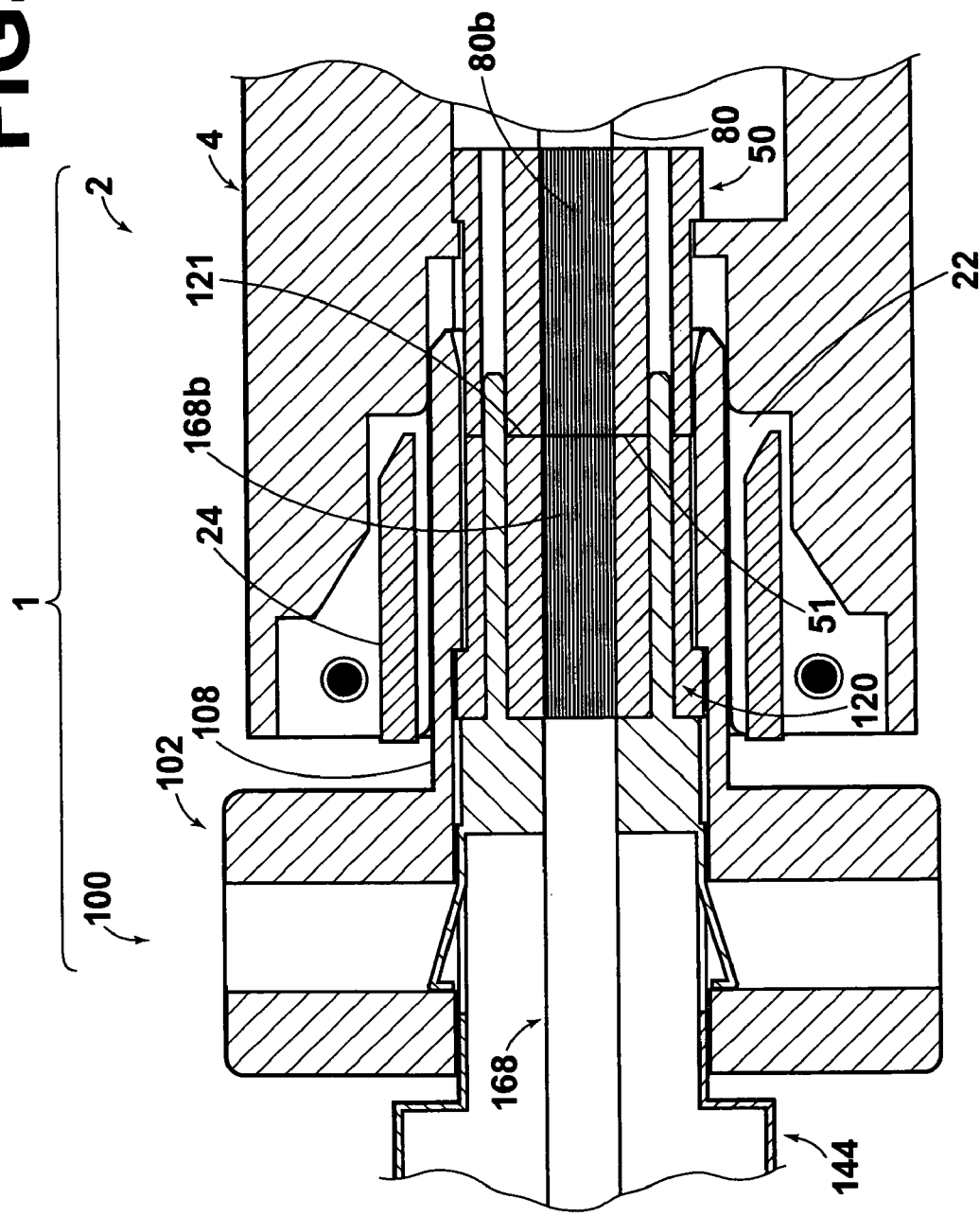

MULTI CORE OPTICAL CONNECTOR ASSEMBLY

FIELD OF THE INVENTION

The present invention relates to a multi core optical connector assembly and more particularly to a multi core optical connector assembly that connects great numbers of ferrules, holding the ends of optical fiber cables, to each other.

BACKGROUND

There is a known multi core optical connector assembly as disclosed in Japanese Unexamined Patent Publication No. 2002-148486 (FIG. 1, FIG. 4). This multi core optical connector comprises a plug side optical connector including a first housing and a guide housing to the exterior of the first housing; and a receptacle side optical connector having a second housing. The first housing has guide pins and houses a plurality of multi core ferrules, each having ferrule guide pins. The second housing has guide apertures for receiving the guide pins of the first housing and also houses a plurality of multi core ferrules each having ferrule guide apertures. Alignment of the housings is realized by a two step process. First, the guide housing and the second housing of the receptacle side optical connector are engaged. Then, the guide pins of the first housing are inserted into the guide apertures of the second housing. The alignment of the multi core ferrules is realized by inserting the ferrule guide pins of the first housing into the ferrule guide apertures of the second housing.

In the known multi core optical connector assembly described above, the positioning accuracy of the multi core ferrules depends on the exterior dimensions of the multi core ferrules and the dimensions of the openings of the first and second housings that house the multi core ferrules. Accordingly, even if the guide pins of the first housing are inserted into the guide apertures of the second housing to align them with respect to each other, alignment of the multi core ferrules with respect to each other is not guaranteed. In other words, there is a possibility that the ferrule guide pins, which serve as final guides, cannot be inserted into the ferrule guide apertures, depending on the exterior dimensions of the multi core ferrules and the openings of the housings.

SUMMARY

The present invention has been developed in view of the foregoing circumstances. It is an object of the present invention, among others, to provide a multi core optical connector assembly, which is capable of positively connecting pluralities of multi core ferrules to each other.

It is another object of the present invention to provide a multi core optical connector assembly, in which defective multi core ferrules can be exchanged.

The multi core optical connector assembly of the present invention comprises a plug side optical connector having plug housing and a receptacle side optical connector having a receptacle housing that engages with the plug housing. The plug housing has a plurality of first multi core ferrules and a forwardly facing guide post. The receptacle housing has a plurality of second multi core ferrules and a guide post hole for receiving the guide post. The first and second multi core ferrules hold the ends of optical fiber cables to be connected to each other. A first guiding mechanism is formed by the interior shape of an engagement portion of the plug housing and the exterior shape of an engagement portion of the receptacle housing, which is to be guided and inserted into the engagement portion of the plug housing. A second guiding mechanism is formed by the guide post and the guide hole. A third guiding mechanism is formed by the interior shape of the engagement portion of the receptacle housing and the exterior shapes of the first plug side multi core ferrules, which are to be inserted into the engagement portion of the receptacle housing. A fourth guiding mechanism is formed by guide pins of the first or second multi core ferrules and guide pin apertures, for receiving the guide pins, of the second or first multi core ferrules. The first, second, third, and fourth guiding mechanisms operating sequentially in number order during engagement of the receptacle side optical connector and the plug side optical connector.

BRIEF DESCRIPTION OF THE DRAWINGS

FIG. 15 is a partial enlarged vertical sectional view of a state in which engagement is complete.

DETAILED DESCRIPTION OF THE EMBODIMENT(S)

Figure 1:
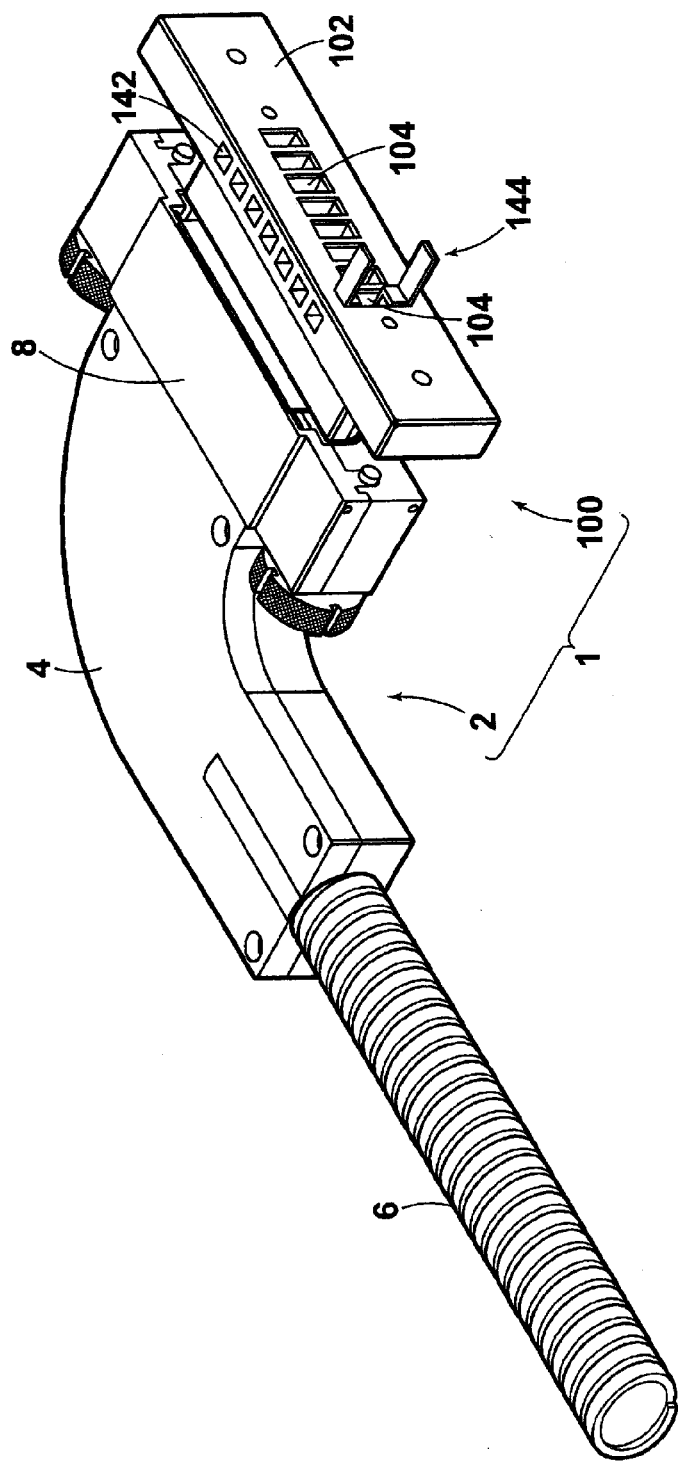
FIG. 1 is a perspective view that illustrates the outward appearance of a multi core optical connector assembly of the present invention.

Hereinafter, an embodiment of the multi core optical connector assembly according to the present invention will be described in detail with reference to the attached drawings. FIG. 1 is a perspective view that illustrates the outward appearance of a multi core optical connector assembly 1

(hereinafter, simply referred to as "assembly") of the present invention. As illustrated in FIG. 1, the assembly 1 includes a plug side optical connector 2 and a receptacle side optical connector 100. The plug side optical connector 2 has a plug housing 4, which is formed by die cast aluminum or molded from conductive resin. A metallic tube 6 may be connected to the plug housing 4. Optical fiber cables are to be provided in the tube 6. Therefore, the tube 6 is constructed to be flexible, yet sufficiently strong to prevent crushing thereof. A rectangular engagement portion 8 is formed on the plug housing 4. The engagement portion 8 is to be connected to the receptacle side optical connector 100.

As illustrated in FIG. 1, the receptacle side optical connector 100 has a receptacle housing 102, which is of a substantially rectangular shape. Rectangular openings 104, into which multi core ferrules to be described later are to be mounted, are formed at predetermined spacings at the central portion of the receptacle housing 102 along the longitudinal direction thereof. In FIG. 1, the receptacle side optical connector 100 is positioned in the immediate vicinity of the engagement portion 8 of the plug side optical connector 2, that is, in a state in which a connection between the two will be made by urging them toward each other. Note that in FIG. 1, an optical fiber mounting assembly 144 (refer to FIG. 9) is attached to only the leftmost opening 104. In actuality, an optical fiber mounting assembly 144 is attached to all of the openings 104.

Figure 10:
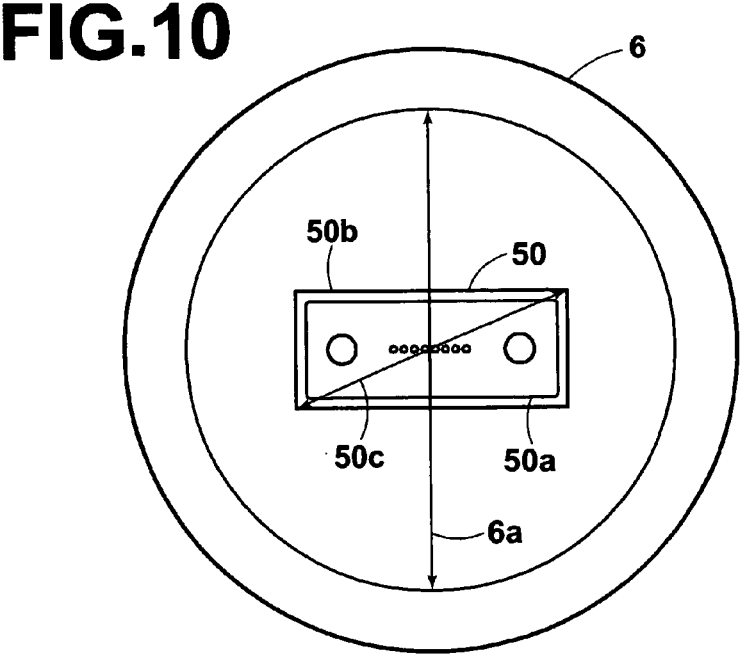
FIG. 10 is a schematic diagram that illustrates a tube employed in the optical connector assembly of FIG. 1, and a multi core ferrule positioned within the tube.

Here, the relationship among the tube 6 and the multi core ferrules 50 will be described with reference to FIG. 10. FIG. 10 is a schematic diagram that illustrates the tube 6 and a multi core ferrule 50 positioned within the tube 6. The inner diameter 6a of the tube 6 is greater than the dimensions of the outer contour of the multi core ferrule 50, that is, the diagonal line 50c that crosses the rear portion 50b thereof. In other words, the inner diameter 6a of the tube 6 is of a size that enables the multi core ferrule 50, to which an optical fiber cable 80 (refer to FIG. 3) is attached, to pass therethrough. Further, the inner diameter 6a of the tube 6 is of a size that enables bundled optical fiber cables 80 to pass therethrough. Thereby, if defects, such as breakage, occur in one or more optical fiber cables during manufacture or use of the assembly 1, the multi core ferrule 50 and the bundled optical fiber cable 80 can be removed through the tube 6 and exchanged.

Figure 2:
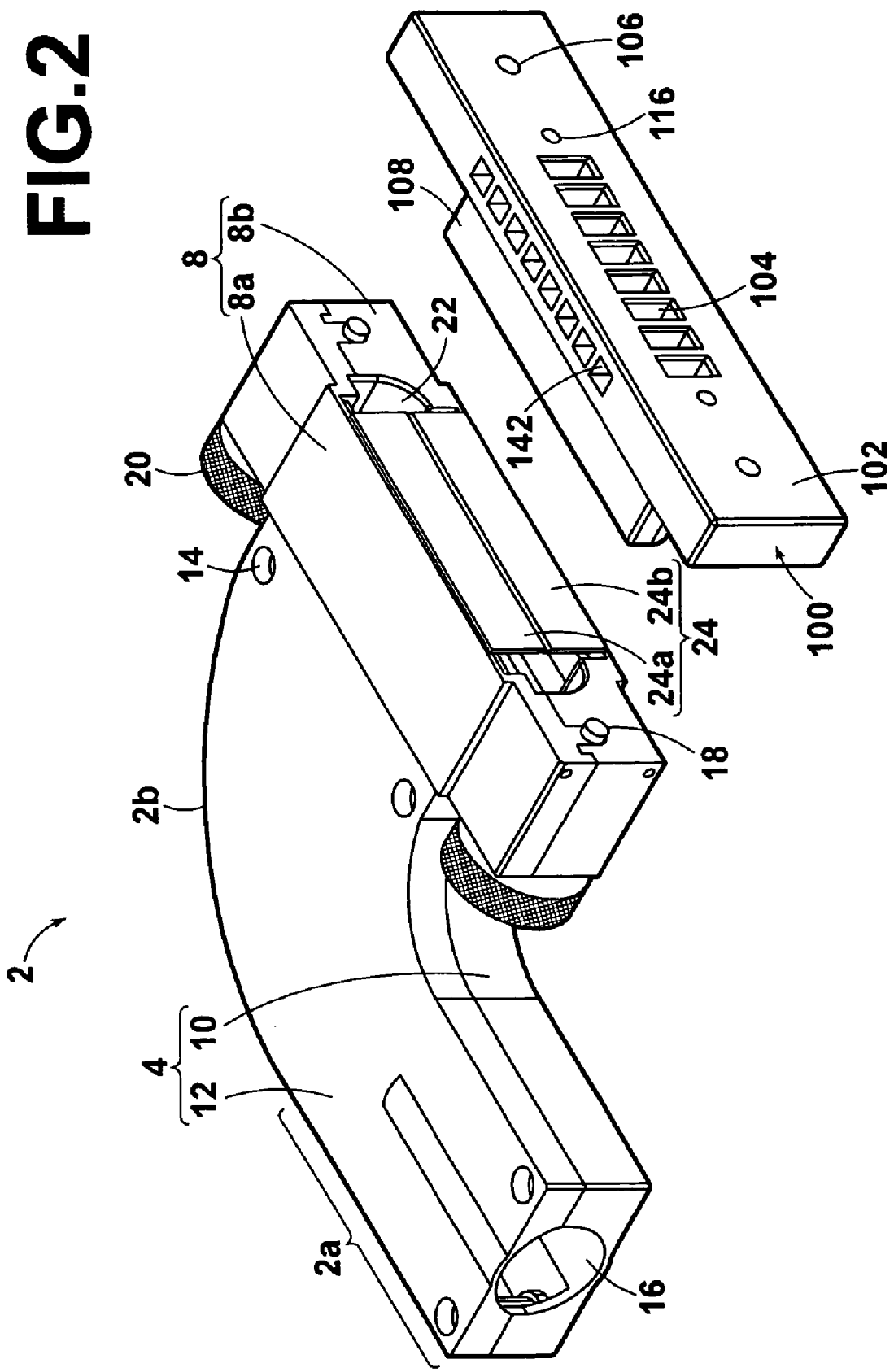
FIG. 2 is a perspective view that illustrates a plug housing of a plug side optical connector and a receptacle housing of a receptacle side optical connector, in a state in which they are separated from each other.

Next, the plug housing 4 and the receptacle housing 102 will be described in further detail with reference to FIG. 2. FIG. 2 is a perspective view that illustrates the plug housing 4 of the plug side optical connector 2 and the receptacle housing 102 of the receptacle side optical connector 100 in a state in which they are separated from each other. The plug side optical connector 2 includes a linear portion 2a and a curved portion 2b. The plug housing 4 is formed from a bottom housing 10 and a cover housing 12, which are separable in the vertical direction. The bottom housing 10 and the cover housing 12 are fixed to each other by screws. The screws are threaded through holes 14 shown in FIG. 2. A circular opening 16, to which the tube 6 is to be mounted, is formed cooperatively by the bottom housing 10 and the cover housing 12 at the rear end of the plug housing 4 opposite that of the engagement portion 8.

The engagement portion 8 is also of a two component structure. An upper portion 8a is integrally formed with the cover housing 12, and a lower portion 8b is integrally formed with the bottom housing 10. Engaging thumb screws 18, which are rotatably held by the upper portion 8a and the lower portion 8b, are provided at both sides of the engagement portion 8. When the receptacle side optical connector 100 and the plug side optical connector 2 are engaged, the engaging thumb screws 18 maintain the engagement therebetween. A knob 20 is integrally formed at the rear end of each engaging thumb screw 18. The knobs 20 are rotated to insert the tips of the engaging thumb screws 18 into threaded apertures 106 of the receptacle side optical connector 100, to fix the optical connectors to each other.

An engagement recess 22, which is open toward the front, is formed in the engagement portion 8. If the engagement recess 22 is viewed from the front, it is of a vertically asymmetrical shape, thereby precluding erroneous (vertically inverted) insertion of the receptacle side optical connector 100. An shutter 24 that substantially seals the engagement recess 22 is attached to the engagement portion 8. The shutter 24 is formed of a pair of horizontally extending shutter halves 24a and 24b, which are provided at the upper and lower halves of the engagement recess 22. The shutter halves 24a and 24b are urged closed by torsion springs 27a (refer to FIG. 5) to close the engagement recess 22. During engagement with the receptacle side optical connector 100, the engagement portion 108 presses the shutter halves 24a and 24b to rotate toward the interior of the engagement recess 22, thereby opening the engagement recess 22. The shutter 24 is provided to protect the eyes of operators, by shielding light emitted from optical fiber cables 80 (refer to FIG. 3).

Figure 3:
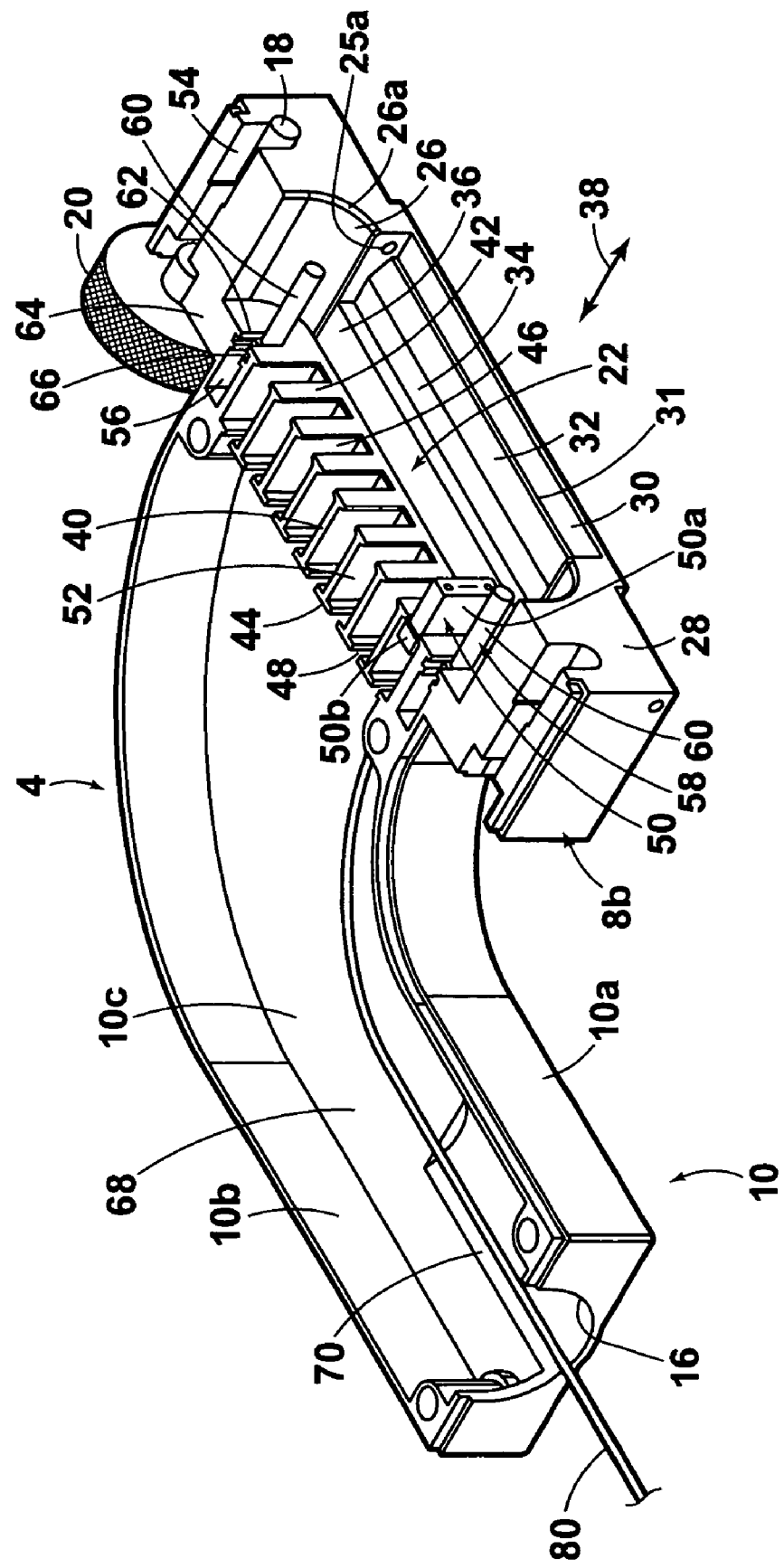
FIG. 3 is a perspective view of the plug housing, in which a cover housing has been removed, that illustrates only the bottom housing.

Next, the plug housing 4 will be described in further detail with reference to FIG. 3. FIG. 3 is a perspective view of the plug housing 4, in which the cover housing 12 has been removed, that illustrates only the bottom housing 10. Arcuate surfaces 26 are formed at both ends of the engagement recess 22 in the longitudinal direction thereof. Curved guide surfaces 26a are formed at the front surface of lower portion 8b of the engagement portion 8. That is, the curved guide surfaces 26a are formed continuous with an engagement surface 28, along the arcuate surfaces 26. Note that the guide surfaces 26a may be tapered surfaces instead of being curved surfaces. The engagement recess 22 comprises: a step 30, at which the shutter 24 (refer to FIG. 2) is positioned when the engagement recess 22 is closed; a vertical surface 31, which is continuous with the step 30; an inclined portion 32, which is continuous with the vertical surface 31; a step 34, for receiving the shutter 24 when in an open state, positioned above the inclined portion 32; and a flat portion 36, which is positioned above the step 34. Apertures 25a, to which a rotating shaft 25 (refer to FIG. 5) of the shutter 24 are attached, are provided at the lower portions of the engagement recess 22 at both ends in the longitudinal direction thereof.

A plurality of partition walls 40 that extend in an insertion/extraction direction 38 of the connectors are integrally formed with a bottom surface 10c, to extend upwardly therefrom. Vertically extending ribs 42 and 44 are integrally formed at the front and the rear of each partition wall 40. The partition walls 40 and the ribs 42 and 44 constitute a plurality of cavities 52, into which the multi core ferrules 50 (first multi core ferrules) are to be arranged. Openings 46, through which the multi core ferrules 50 protrude, are formed at the front sides of the cavities 52, and slots 48, through which optical fiber cables are led out, are formed at the rear sides of the cavities 52. The tops of the cavities 52 are open, but are sealed by the cover housing 12 (refer to FIG. 2) when the cover housing 12 is fixed to the bottom housing 10.

Grooves 54, for receiving the engaging thumb screws 18, are formed at both ends of the lower portion 8b of the engagement portion 8. FIG. 3 clearly illustrates one of the engaging thumb screws 18 provided in one of the grooves 54. Recesses 56, which are open toward the front and above, are formed in the vicinities of the leftmost and rightmost cavities 52. Guide members 58 are provided within the recesses 56. Slots 62, which are open toward the front, are formed in the recesses 56. Guide posts 60 that function as the guide members 58 protrude from the slots 62. The tips of the guide posts 60 are positioned within the engagement recess 22, and therefore are protected from external elements. A pair of grooves 66 that extend downward from an upper surface 64 of the lower portion 8*b* is formed within each recess 56 in the vicinity of the slots 62. The guide members 58, which are provided within the recesses 56, will be described in detail later.

Each of the multi core ferrules 50, which are arranged within the cavities 52, comprises: a front portion 50*a*, having a width slightly narrower than the opening 46; and a rear portion 50*b*, having a width slightly wider than the openings 46. By this construction, a frontward facing shoulder 53 (refer to FIG. 6) is formed about the entire periphery of the rear portion 50*b* of each multi core ferrule 50. In addition, the rear portions 50*b* are urged forward by compression coil springs 78 (refer to FIG. 6), which are provided within the cavities 52. Thereby, only the front portions 50*a* protrude through the openings 46, and the shoulders 53 are maintained in a state in which they abut the ribs 42. Note that the compression coil springs 78 are omitted from FIG. 3.

The interior of the bottom housing 10 toward the rear of the engagement portion 8 is a space 68, defined by walls 10*a* and 10*b*. Optical fiber cables 80 that extend from the multi core ferrules 50 are provided within the space 68. A single optical fiber cable 80 is illustrated in FIG. 3. Note that a recess 70 having a curved surface is formed in the bottom wall 10*c* of the bottom housing 10, continuous with the opening 16. The end of the tube 6 is to be arranged in the recess 70.

Figure 4:
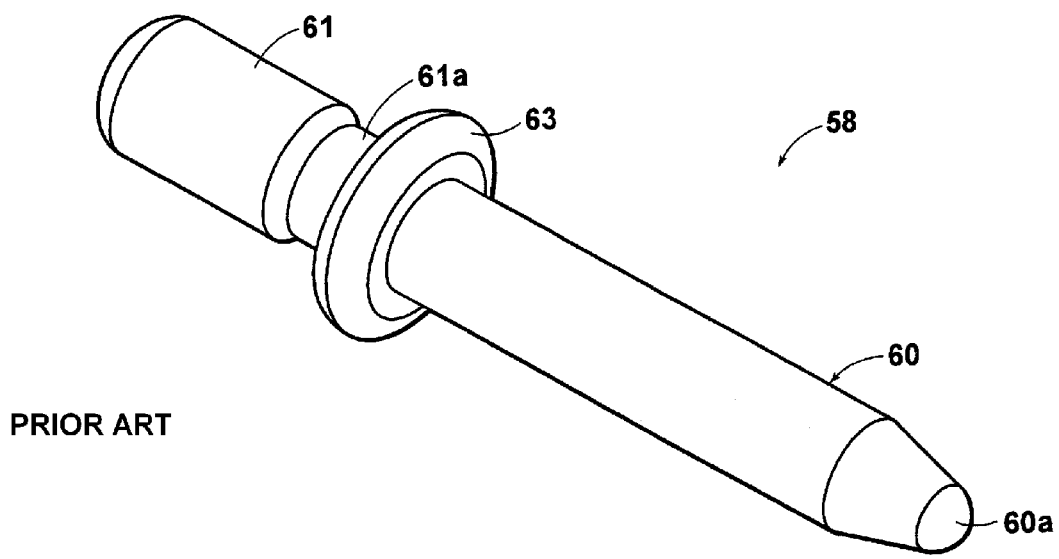
FIG. 4 is a perspective view that illustrates a guide member employed in the plug housing of FIG. 3.

Next, the guide member 58 will be described with reference to FIG. 4. FIG. 4 is a perspective view that illustrates the guide member 58. The guide member 58 comprises: a cylindrical guide post 60, which has a tapered tip that ends in a spherical surface 60*a*; a discoid flange 63, positioned at the rear end of the guide post 60; and a cylindrical regulating portion 61, which is formed behind the flange 63 via a thin axial portion 61*a*. The regulating portion 61 is placed within the recesses 56 (refer to FIG. 3), and the flange 63 is housed within the grooves 66. The diameter of the regulating portion 61 is substantially the same as the intervals between the partition walls that define the recesses 56, therefore, lateral movement within the recesses 5 is regulated. In addition, the engagement between the flange 63 and the grooves 66 regulates movement of the guide member 58 in the insertion/extraction direction 38. In this manner, the guide members 58 are fixed within the recesses 56, with their axes aligned with the insertion/extraction direction 38.

Figure 5:
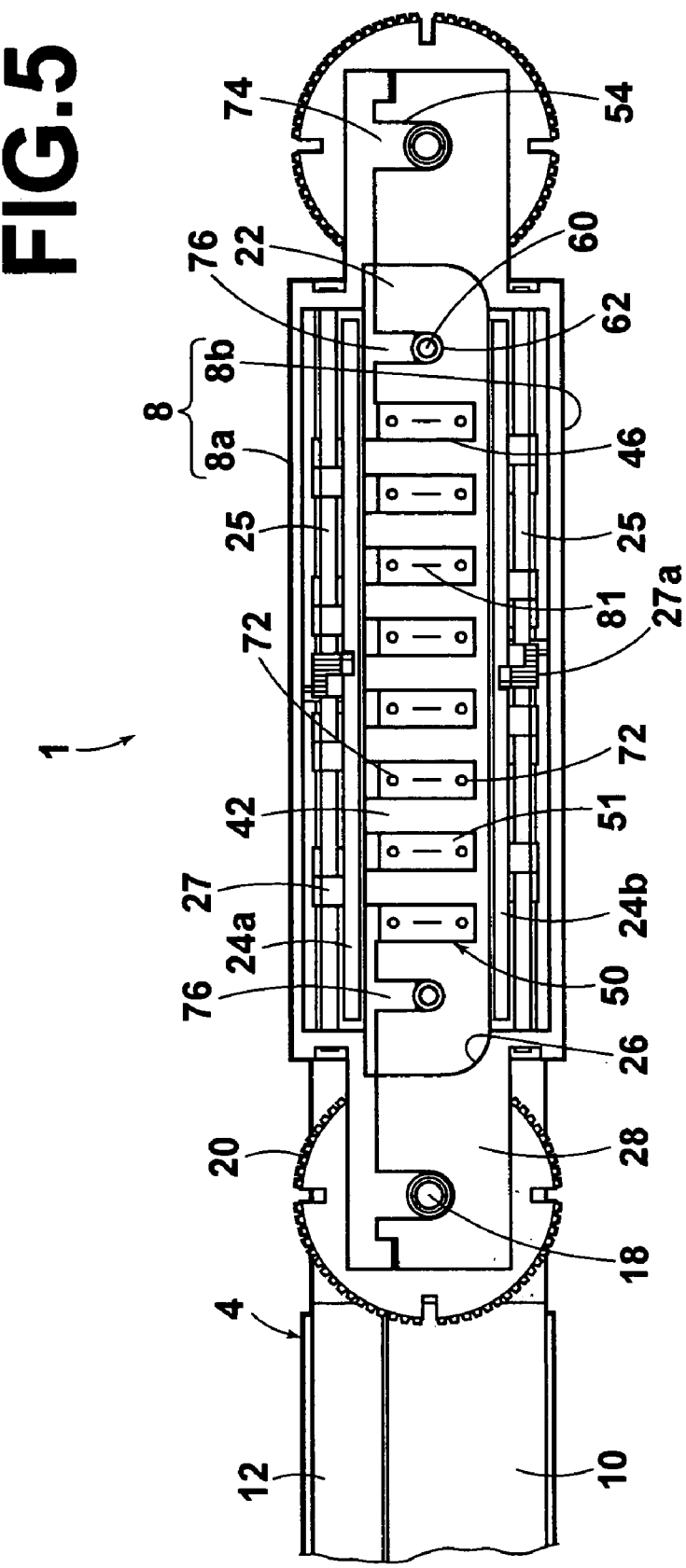
FIG. 5 is a front view that illustrates the plug side optical connector, viewed from the side of an engagement surface.

FIG. 5 is a front view that illustrates the plug side optical connector 2 constructed as described above, viewed from the side of the engagement surface 28. FIG. 5 clearly illustrates the vertically asymmetrical shape of the engagement recess 22. FIG. 5 also illustrates that eight multi core ferrules 50 are provided within the engagement recess 22. Protrusions 74 and 76 are provided on the cover housing 12, at positions corresponding to those of the grooves 54 and the slots 62 of the lower portion 8*b*. The protrusions 74 and 76 cooperate with the grooves 54 and the slots 62, to hold the engaging thumb screws 18 and the guide posts 60.

Note that the portions denoted by reference numeral 25 are the rotating shafts of the shutter halves 24*a* and 24*b*, which are fixed to the plug housing 4 at both ends within the engagement recess 22. A plurality of bearings 27 are integrally formed on the resin shutter 24, and the rotating shafts 25 are inserted through the bearings 27. In addition, the torsion springs 27*a* are wound about the central portions of the rotating shafts in the longitudinal directions thereof, to urge the shutter 24 in a closing direction. Guide pin apertures 72 are formed in vertically arranged pairs in the front surfaces 51 of the multi core ferrules 50, near end faces 81 (refer to FIG. 6) of eight optical fibers 80*b* are exposed between each pair of guide pin apertures 27. Note that in FIG. 5, the column of the end faces 81 are illustrated as a straight line. The details of this construction will be described later.

Figure 6:
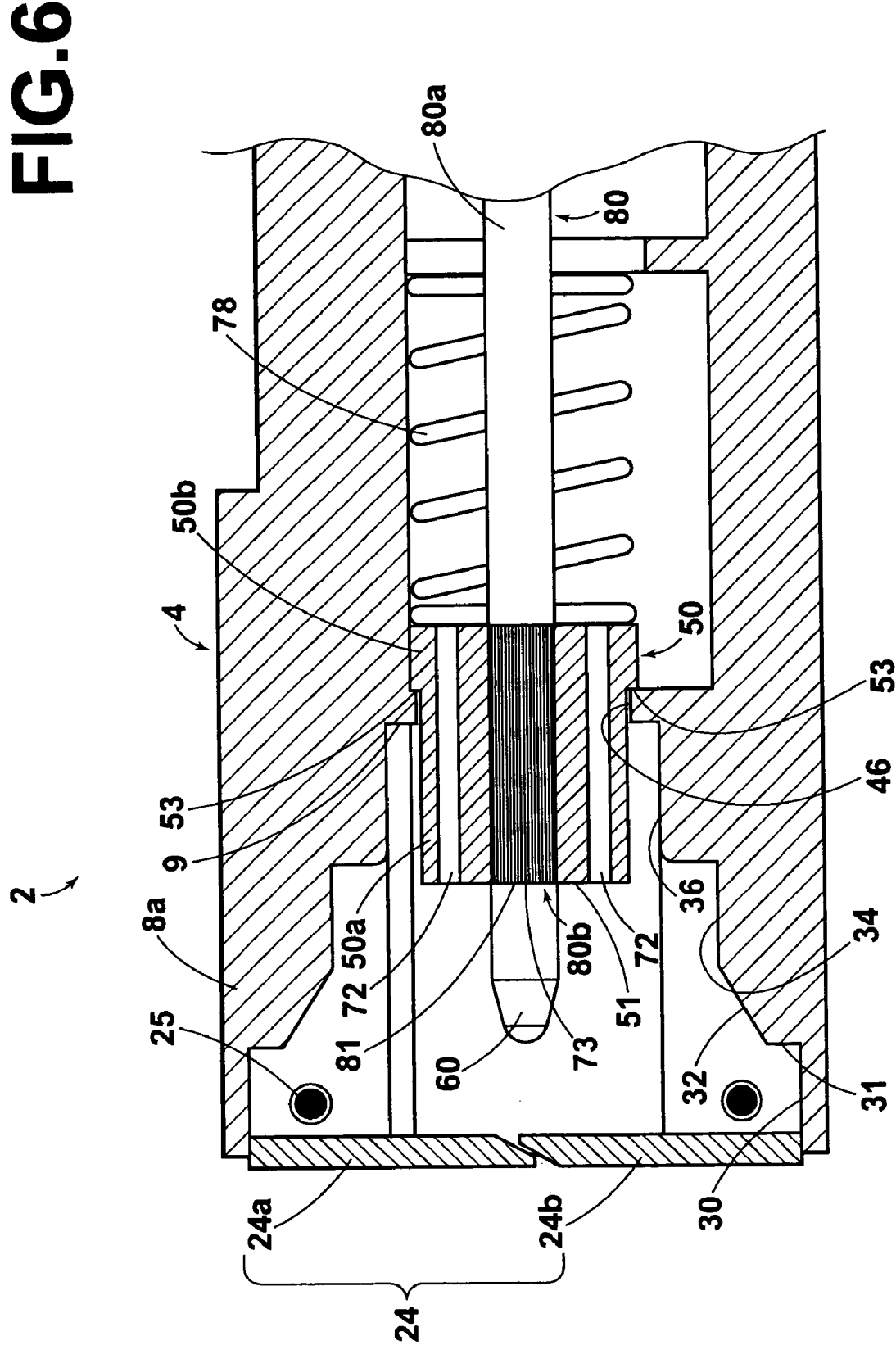
FIG. 6 is a partial enlarged vertical sectional view that illustrates the plug side optical connector having a multi core ferrule provided therein.

FIG. 6 is a partial enlarged vertical sectional view that illustrates the plug side optical connector 2 having a multi core ferrule 50 provided therein. The multi core ferrule 50 is fixed within the cavity 52, by the shoulder 53 thereof abutting the opening 46 and a rib 9 of the upper portion 8*a*. The state in which the compression coil spring 78 urges the multi core ferrule 50 forward is also clearly illustrated in FIG. 6. Eight optical fiber paths 73 are formed between the guide pin apertures 72 and 72. The optical fibers 80*b*, which are stripped of their covering 80*a* are held within the optical fiber paths 73 in a single column in the vertical direction. The front surface 51 of the multi core ferrule 50 and the end faces 81 of the optical fibers 80*b* are coplanar. Note that the torsion spring 27*a* that urges the shutter 24 is omitted from FIG. 6.

Figure 7:
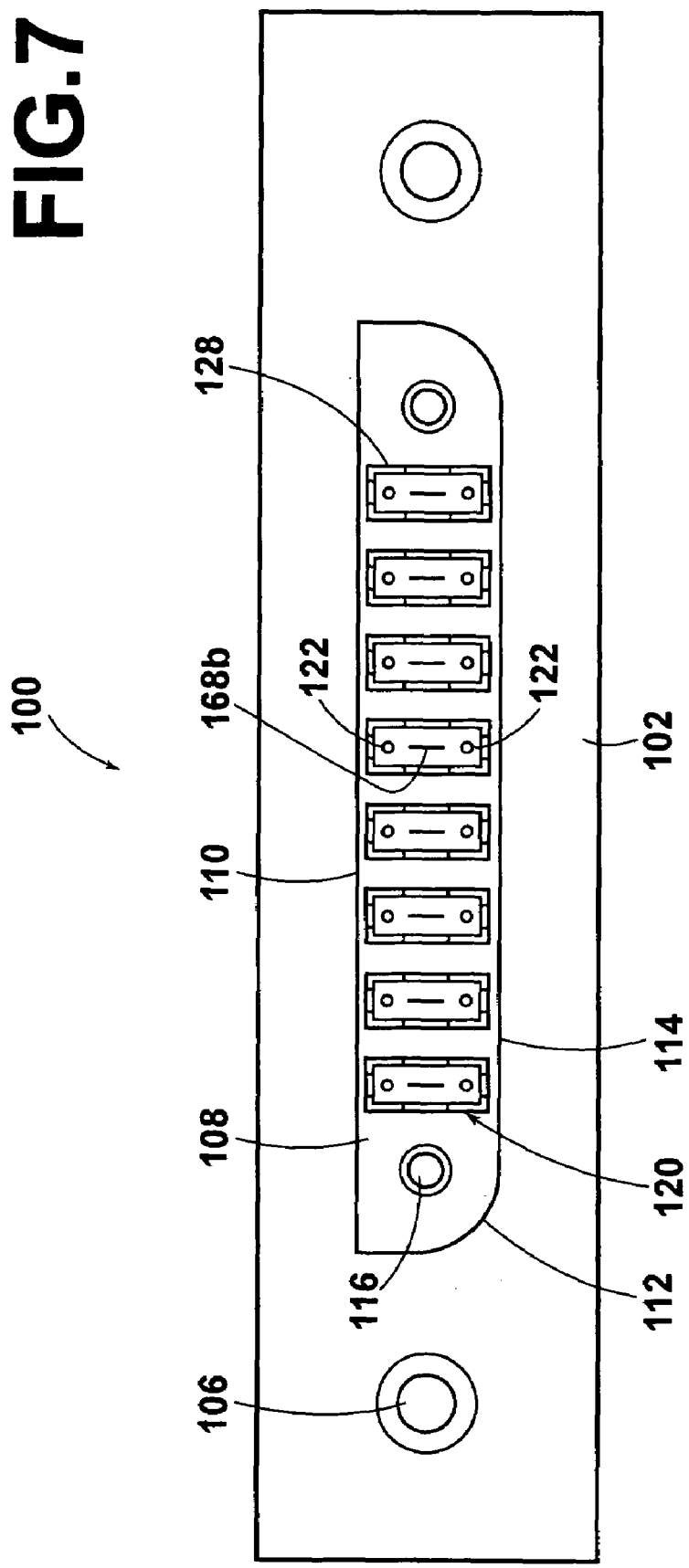
FIG. 7 is a front view of the receptacle side optical connector, viewed from the side of an engagement portion.
Figure 8:
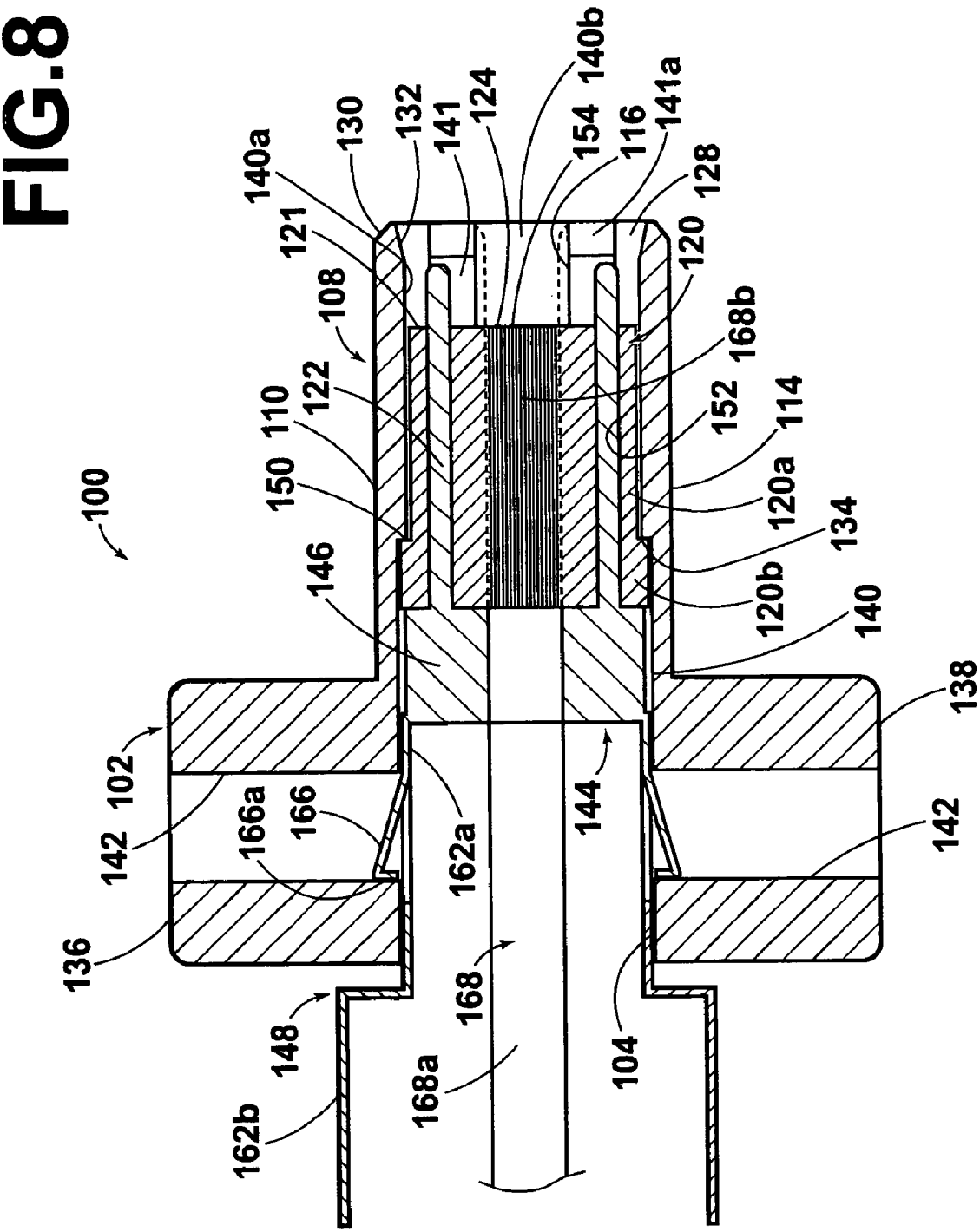
FIG. 8 is an enlarged vertical sectional view of the receptacle side optical connector.

Next, the receptacle side optical connector 100 will be described in detail. FIG. 7 is a front view of the receptacle side optical connector 100, viewed from the side of the engagement portion 108. FIG. 8 is an enlarged vertical sectional view of the receptacle side optical connector 100. Note that the sectional shape of the optical fiber mounting assembly 144 is schematically illustrated in FIG. 8. Hereinafter, a description will be given with reference to FIG. 7 and FIG. 8. As illustrated in FIG. 7, the outer shape of the engagement portion 108 is complementary to the inner shape of the engagement recess 22 of the plug side optical connector 2, and is also vertically asymmetrical. That is, the engagement portion 108 comprises a flat upper surface 110 and a lower surface 114 having curved surfaces 112 at both ends thereof.

Multi core ferrules 120 (second multi core ferrules) are provided in the engagement portion 108, at positions corresponding to those of the multi core ferrules 50 of the plug side optical connector 2. Guide pins 122 are provided on the multi core ferrules 120, at positions corresponding to those of the guide pin apertures 72 of the multi core ferrules 50. Guide post holes 116 are provided at both ends of the engagement portion 108, at positions corresponding to those of the guide posts 60 of the plug side optical connector 2. Threaded apertures 106, for the engaging thumb screws 18 to be inserted into, are formed at both ends of the receptacle housing 102.

Next, a further detailed description will be given with reference to FIG. 8. As illustrated in FIG. 8, a rectangular front opening 128 that communicates with the opening 104 at the rear is formed in the engagement portion 108. The space between the front opening 128 and the opening 104 is a ferrule housing path 140. Inwardly facing tapers 130 are formed on the exterior surface at the tip of the engagement portion 108, and outwardly facing tapers 132 are formed continuous with the upper and lower inner surfaces 140*a* of the front opening 128. Rearward facing steps 134 are formed in the engagement portion 108 between the front opening 128 and the opening 104. Rectangular engaging apertures 142 are formed from an upper surface 136 of the receptacle housing 102 to the ferrule housing path 140, and from a lower surface 138 of the receptacle housing 102 to the ferrule housing path 140. The engaging apertures 142 are formed to be perpendicular to the ferrule housing path 140.

Vertically separated ridges 141, having outwardly facing tapers 141a at their front ends, are formed on side walls 140b of the ferrule housing path 140. Accordingly, a total of four ridges 141 are formed on the left and right side walls 140b. The ridges 141 position the multi core ferrule 120 in the lateral direction within the ferrule housing path 140.

Figure 9:
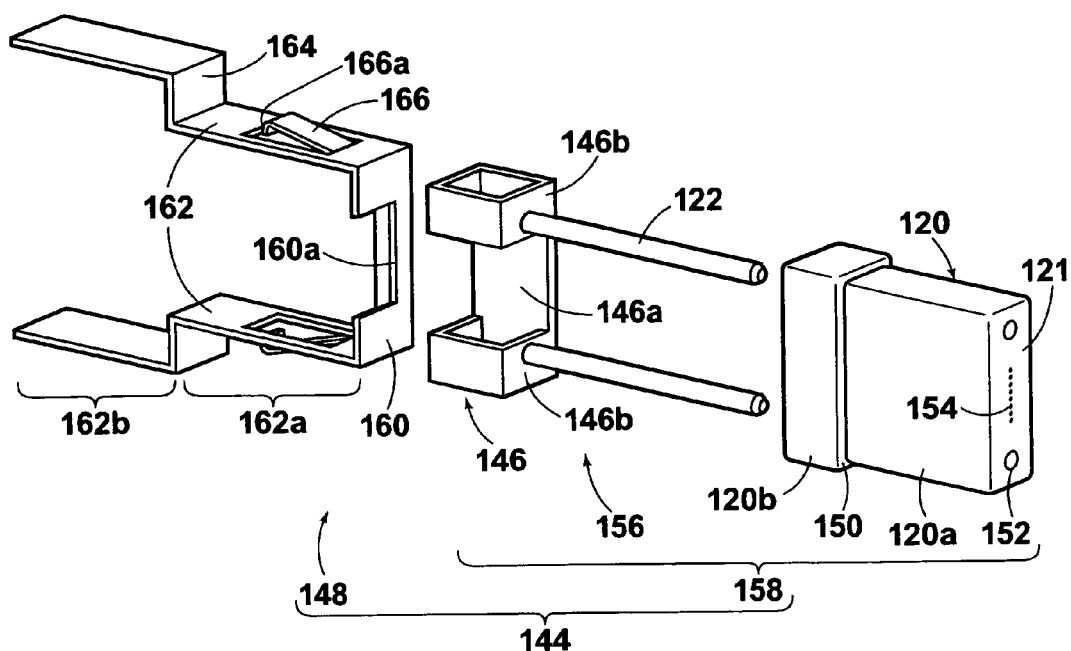
FIG. 9 is an exploded perspective view of an optical fiber mounting assembly.

Next, the optical fiber mounting assembly 144, which is provided in the ferrule housing path 140, will be described with combined reference to FIG. 9. FIG. 9 is an exploded perspective view of the optical fiber mounting assembly 144. The optical fiber mounting assembly 144 comprises: the multi core ferrule 120; a guide pin assembly 156, constituted by a pair of guide pins 122 and a base 146, to which the guide pins 122 are attached; and a clip 148, which is positioned behind the base 146 and supports the base 146.

The multi core ferrule 120 is of a shape similar to that of the multi core ferrule 50, and comprises a front portion 120a and a rear portion 120b. A forward facing shoulder 150 is formed around the periphery of the rear portion 120b. Guide pin apertures 152 and optical fiber paths 154 are also formed in the multi core ferrule 120, in a manner similar to that of the multi core ferrule 50. As illustrated in FIG. 8, an optical fiber cable 168 is connected to the receptacle side optical connector 100. Optical fibers 168b, from which a covering 168a has been stripped, at the tip of the optical fiber cable 168 are inserted into each of the optical fiber paths 154. The optical fiber cable 168 is omitted from FIG. 9.

The guide pin assembly 156 is constituted by the guide pins 122, which are formed of metallic wire having circular cross sections, and the base 146, to which the guide pins 122 are fixed by swaging or the like. The guide pin assembly 156 is preferably formed using stainless steel as the material thereof. The base 146 comprises a pair of rectangular frames 146b, and a planar link 146a that links the two frames 146b. A single guide pin 122 is attached to each frame 146b. The optical fiber cable 168 is to be provided between the two frames 146b. The guide pins 122 of the guide pin assembly 156 are inserted into the guide pin apertures 152 from the rear of the multi core ferrule 120, and the base 146 supports the rear portion 120b of the multi core ferrule 120 from behind. Note that the guide pin assembly 156 and the multi core ferrule 120 are designated as a multi core ferrule assembly 158 in the state that they are assembled together. The guide pins 122 protrude from the front surface 121 of the multi core ferrule 120 in the state in which the guide pin assembly 156 is mounted on the multi core ferrule 120 (refer to FIG. 8). However, the tips of the guide pins 122 are positioned within the interior of the engagement portion 108, therefore they are protected from external elements.

The clip 148 is formed by punching and bending a single metal plate having spring like properties. The clip 148 comprises: a planar support portion 160, for supporting the base 146; and a pair of arms 162 that extend rearward from both ends of the support portion 160. A cutout 160a, for the optical fiber cable 168 to pass through, is formed in the support portion 160. The arms 162 comprise: front portions 162a that extend substantially parallel to the support portion 160; and rear portions 162b that extend parallel via outwardly opening step portions 164. Latch protrusions 166 (engaging portions) having rearward facing stop surfaces 166a are formed by cutting and bending the front portions 162a. The support portion 160 and the base 146 may be fixed to each other by adhesion, or by simply abutting each other.

When the optical fiber mounting assembly 144 constructed as described above is inserted into the ferrule housing path 140 from behind, the shoulder 150 of the multi core ferrule 120 abuts the step 134 within the ferrule housing path 140. The stop surfaces 155a of the latch protrusions 166 engage with the engaging apertures 142 of the receptacle housing 102, and the optical fiber mounting assembly 144 is fixed within the receptacle housing 102. At this time, the rear portions 162b of the clip 148 protrude rearward from the receptacle housing 102. In the case that the optical fiber mounting assembly 144 is to be removed for exchange thereof, the rear portions 162b are gripped so as to approach each other. Then, the front portions 162a flex inward to disengage the latch protrusions 166 and the engaging apertures 142, and the optical fiber mounting assembly 144 can be simply pulled out.

Figure 11:
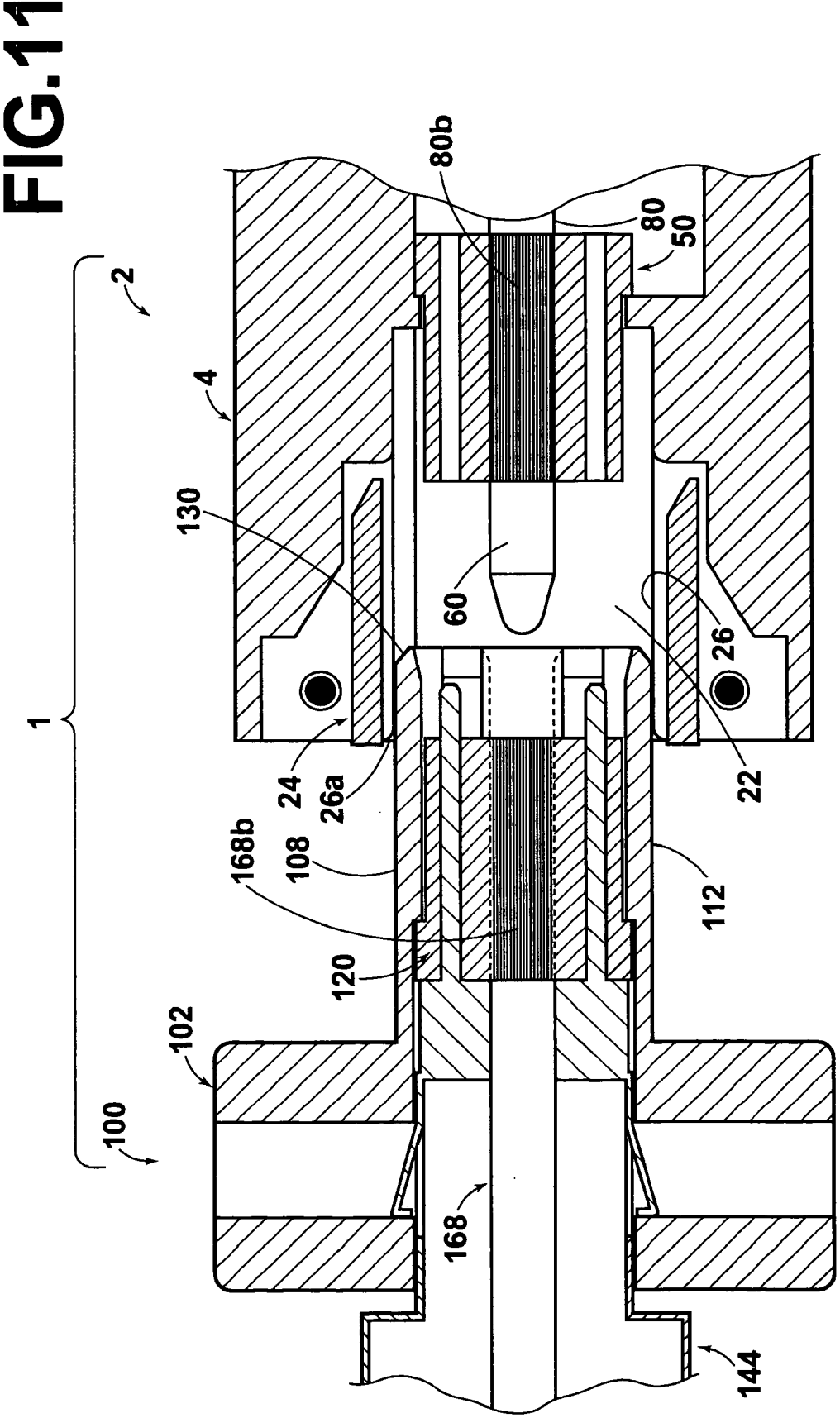
FIG. 11 is a partial enlarged vertical sectional view of the plug side optical connector and the receptacle side optical connector, in the initial stage of engagement.
Figure 12:
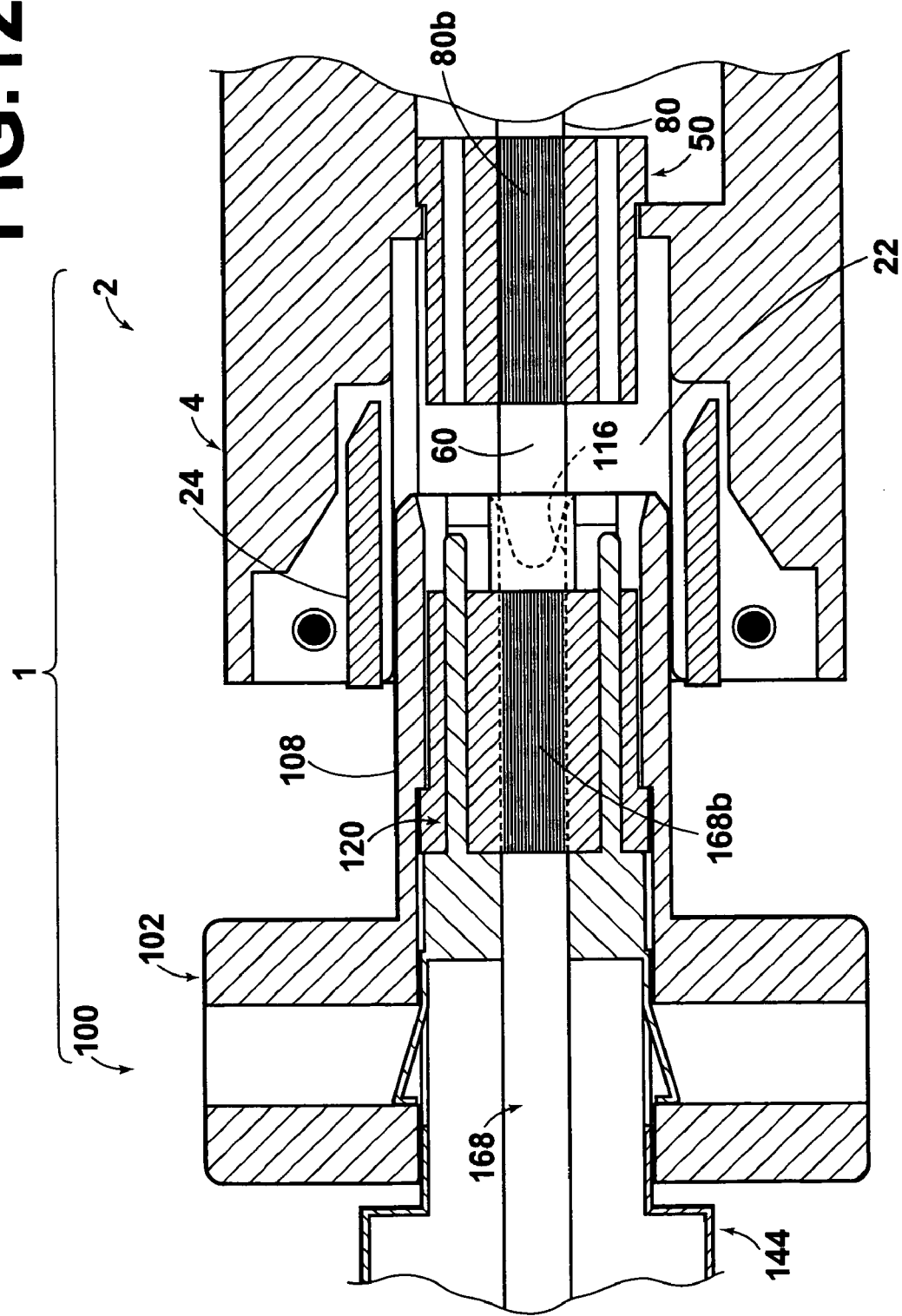
FIG. 12 is a partial enlarged vertical sectional view of a state in which engagement has progressed to a point at which guide posts guide the engagement.
Figure 13:
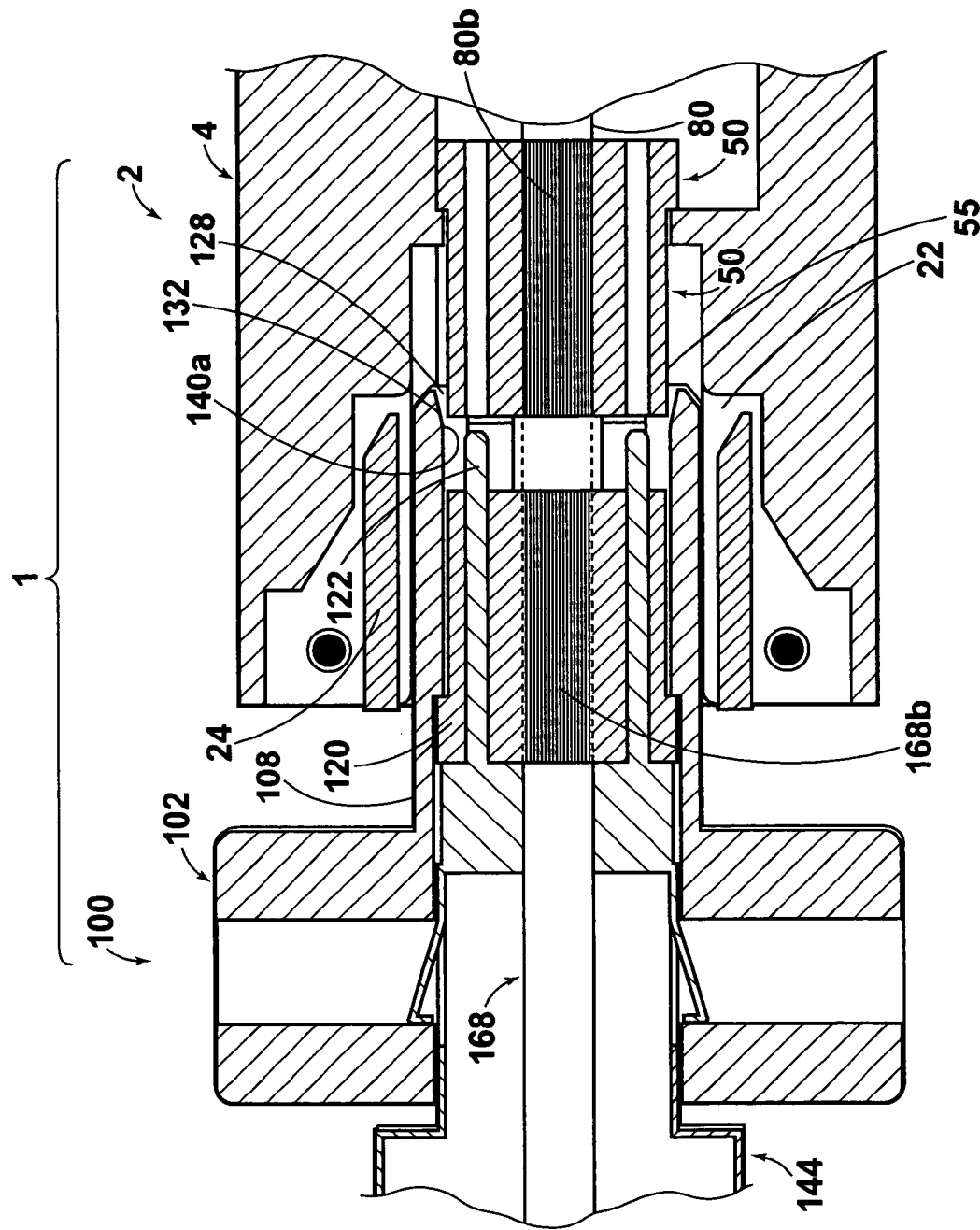
FIG. 13 is a partial enlarged vertical sectional view of a state in which engagement has progressed further, to a point at which the multi core ferrules guide the engagement.
Figure 14:
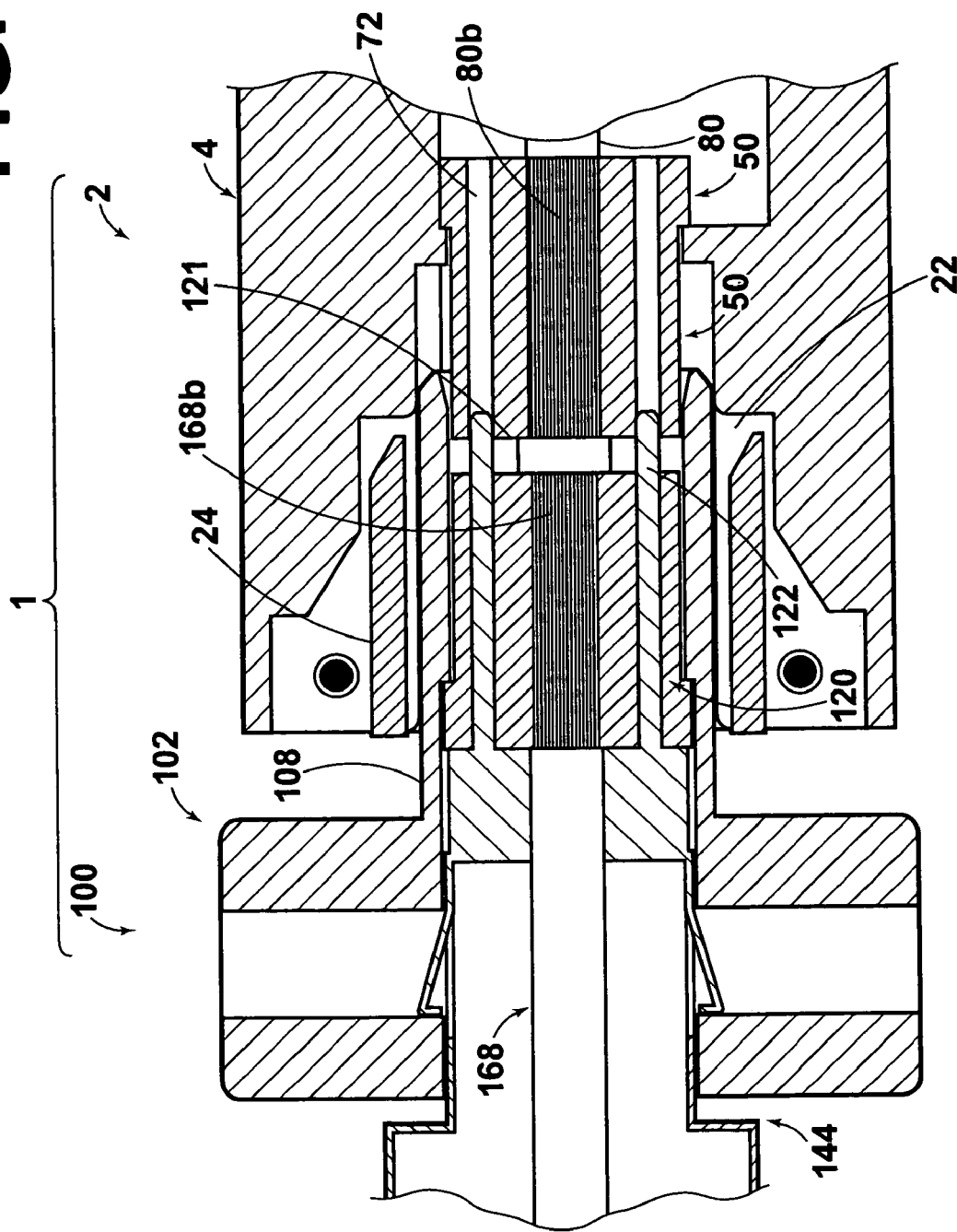
FIG. 14 is a partial enlarged vertical sectional view of a state in which guide pins of the multi core ferrules guide the engagement.

Next, the manner in which the receptacle side optical connector 100 and the plug side optical connector 2 constructed as described above are engaged will be described with reference to FIG. 11 through FIG. 15. FIG. 11 is a partial enlarged vertical sectional view of the two connectors 2 and 100 in the initial stage of engagement. FIG. 12 is a partial enlarged vertical sectional view of a state in which engagement has progressed to a point at which the guide posts guide the engagement. FIG. 13 is a partial enlarged vertical sectional view of a state in which engagement has progressed further, to a point at which the multi core ferrules guide the engagement. FIG. 14 is a partial enlarged vertical sectional view of a state in which the guide pins of the multi core ferrules guide the engagement. FIG. 15 is a partial enlarged vertical sectional view of a state in which engagement is complete. Note that in these figures, the sectional shape of the optical fiber mounting assembly is shown schematically, in the same manner as in FIG. 8.

First, with reference to FIG. 11, the engagement portion 108 of the receptacle side optical connector 100 presses the shutter 24 open and is inserted into the engagement recess 22 of the plug side optical connector 2. At this time, the tapers 130 at the tip of the engagement portion 108 are guided by the curved guide surfaces 26a (refer to FIG. 3) of the engagement recess 22, to facilitate insertion. The engagement portion 108 is guided into the engagement recess 22 by the curved surfaces 26 (refer to FIG. 3) that define the engagement recess 22 such that the curved surfaces 112 and the upper surface 110 of the engagement portion 108 slide into the engagement recess 22. In this manner, the engagement recess 22 and the engagement portion 108 constitute a first guiding mechanism.

Next, as illustrated in FIG. 12, when the engagement portion 108 enters further into the engagement recess 22, the guide post 60 of the plug side optical connector 2 enters the guide post hole 116 of the receptacle side optical connector 100, to align the positions of the connectors with respect to each other. The guide posts 60 and the guide post holes 116 constitute a second guiding mechanism.

Then, as illustrated in FIG. 13, when engagement progresses further, the tip of the multi core ferrule 50 enters the interior of the engagement portion 108. At this time, the tapers 132 of the front opening 128 of the engagement portion 108 guides the tip of the multi core ferrule 50, to align the position of the multi core ferrule 50 with respect to the engagement portion 108. After that, the inner surfaces 140a in the vicinity of the front end of the engagement portion 108 continue to guide the multi core ferrule 50. The guiding by the inner surfaces 140a may continue until guiding by the guide pins 122, which is to follow. Alternatively, guiding by the guide pins 122 may follow immediately after the guiding by the tapers 132, without guiding by the inner surfaces 140a. What is important here is that the inner shape of the engagement portion 108 guides the outer shape of the multi core ferrule 50. The tapers 132, the inner surfaces 140a, and outer surfaces 55 of the multi core ferrule 50 constitute a third guiding mechanism.

Thereafter, when engagement progresses still further as illustrated in FIG. 14, the guide pins 122 of the multi core ferrule 120 enter the guide pin apertures 72 of the multi core ferrule 50. The engagement between the guide pins 122 and the guide pin apertures 72 is positively performed, because the multi core ferrule 50 is already positioned to a degree within the engagement portion 108. In this manner, the guide pins 122 and the guide pin apertures 72 constitute a fourth guiding mechanism.

Finally, when the connectors 2 and 100 are completely engaged, the front surfaces 51 and 121 of the multi core ferrules 50 and 120 abut each other, and the optical fibers 80b and 168b are connected to each other. In this manner, each of the bundles of the optical fibers 80b and 168b are connected to each other simply by engaging the receptacle side optical connector 100 and the plug side optical connector 2. Therefore, blind connections are enabled with extreme ease.

Advantageously, the first and second housings are positioned with respect to each other by the first guiding mechanism, then aligned more accurately in the insertion/extraction direction thereof by the second guiding mechanism. The multi core ferrules of the plug side optical connector and the inner surface of the engagement portion of the receptacle side optical connector are accurately positioned with respect to each other by the third guiding mechanism. The multi core ferrules are accurately positioned with respect to each other by the fourth guiding mechanism. Therefore, optical fiber cables can be positively connected with each other, simply by engaging the optical connectors with each other, without visual confirmation.

An embodiment of the present invention has been described above. However, the present invention is not limited to the above embodiment, and various changes and modifications are possible. For example, the arrangement of the end faces 81 of the optical fibers 80b is not limited to being a single column, and the end faces 81 may be arranged in a plurality of columns. In addition, the number of optical fibers 80b provided in a single column may be nine or greater. Further, there may be cases in which the parts that cover the optical fibers 80 and 168 along the paths thereof within the optical connector assembly 1 are of a nonconductive material. However, it is preferable that conductive materials are employed as a defense against EMI (Electro Magnetic Interference), as in the present embodiment.

Note that the multi core ferrules 50 and 120 described above may be those which are molded from thermal curing resin, such as epoxy, or thermoplastic resin, such as polyphenylene sulfide, and are commercially available. In addition, guide pins may be provided on the multi core ferrules 50 of the plug side optical connector, and guide pin apertures may be provided in the multi core ferrules 120 of the receptacle side optical connector 100.

What is claimed is:

1. A multi core optical connect or assembly, comprising:
a plug side optical connector having a plug housing; and
a receptacle side optical connector having a receptacle housing that engages with the plug housing;
the plug housing having a plurality of first multi core ferrules and a forwardly facing guide post;
the receptacle housing having a plurality of second multi core ferrules and a guide post hole for receiving the guide post;
the first and second multi core ferrules holding the ends of optical fiber cables to be connected to each other;
a first guiding mechanism being formed by the interior shape of an engagement portion of the plug housing and the exterior shape of an engagement portion of the receptacle housing, which is to be guided and inserted into the engagement portion of the plug housing;
a second guiding mechanism being formed by the guide post and the guide hole;
a third guiding mechanism being formed by the interior shape of the engagement portion of the receptacle housing and the exterior shapes of the first plug side multi core ferrules, which are to be inserted into the engagement portion of the receptacle housing;
a fourth guiding mechanism being formed by guide pins of the first or second multi core ferrules and guide pin apertures, for receiving the guide pins, of the second or first multi core ferrules; and
the first, second, third, and fourth guiding mechanisms operating sequentially in number order during engagement of the receptacle side optical connector and the plug side optical connector.

2. A multi core optical connector assembly as defined in claim 1, wherein at least one of the plug housing and the receptacle housing further comprises a flexible tube mounted at a rear end thereof.

3. A multi core optical connector assembly as defined in claim 2, wherein the inner dimension of the tube is of a size that enables the multi core ferrules, to which the optical fiber cables are attached, and the bundled optical fiber cables to pass therethrough.

4. A multi core optical connector assembly as defined in claim 1, wherein the receptacle housing of the receptacle side optical connector further comprises a support member, for supporting the multi core ferrules.

5. A multi core optical connector assembly as defined in claim 4, wherein the support member comprises a support portion for supporting rear portions of the multi core ferrules, and arms that extends rearward from the support portion.

6. A multi core optical connector assembly as defined in claim 5, wherein engaging portions are formed on the arms, such that the engaging portions are engaged with the receptacle housing and are disengageable from the receptacle housing by flexure of the arms.

7. A multi core optical connector assembly as defined in claim 2, wherein the receptacle housing of the receptacle side optical connector further comprises a support member, for supporting the multi core ferrules.

8. A multi core optical connector assembly as defined in claim 7, wherein the support member comprises a support portion for supporting rear portions of the multi core ferrules, and arms that extends rearward from the support portion.

9. A multi core optical connector assembly as defined in claim 8 wherein engaging portions are formed on the arms, the engaging portions are engaged with the receptacle housing and are disengageable from the receptacle housing by flexure of the arms.

10. A multi core optical connector assembly as defined in claim 5, wherein the support portion of the support member is planar.

11. A multi core optical connector assembly as defined in claim 10, wherein the arms are formed as a pair extending from both sides of the support portion.

12. A multi core optical connector assembly as defined in claim 11, wherein the engaging portions are formed on each of the arms.

13. A multi core optical connector assembly as defined in claim 8, wherein the support portion of the support member is planar.

14. A multi core optical connector assembly as defined in claim 2, wherein the arms are formed as a pair extending from both sides of the support portion.

15. A multi core optical connector assembly as defined in claim 14, wherein the engaging portions are formed on each of the arms.

* * * * *

UNITED STATES PATENT AND TRADEMARK OFFICE
CERTIFICATE OF CORRECTION

| | | |
|---|---|---|
| PATENT NO. | : 7,234,876 B2 | Page 1 of 1 |
| APPLICATION NO. | : 11/146710 | |
| DATED | : June 26, 2007 | |
| INVENTOR(S) | : Nobuaki Ohtsu et al. | |

It is certified that error appears in the above-identified patent and that said Letters Patent is hereby corrected as shown below:

Column 9, line 64 after, "A multi core optical", delete "connect or" and insert --connector--.

Signed and Sealed this

Twenty-seventh Day of November, 2007

JON W. DUDAS
*Director of the United States Patent and Trademark Office*